April 13, 1948.   G. E. ROBERTS   2,439,488
WASH CHECK COLLAR
Filed Jan. 25, 1946
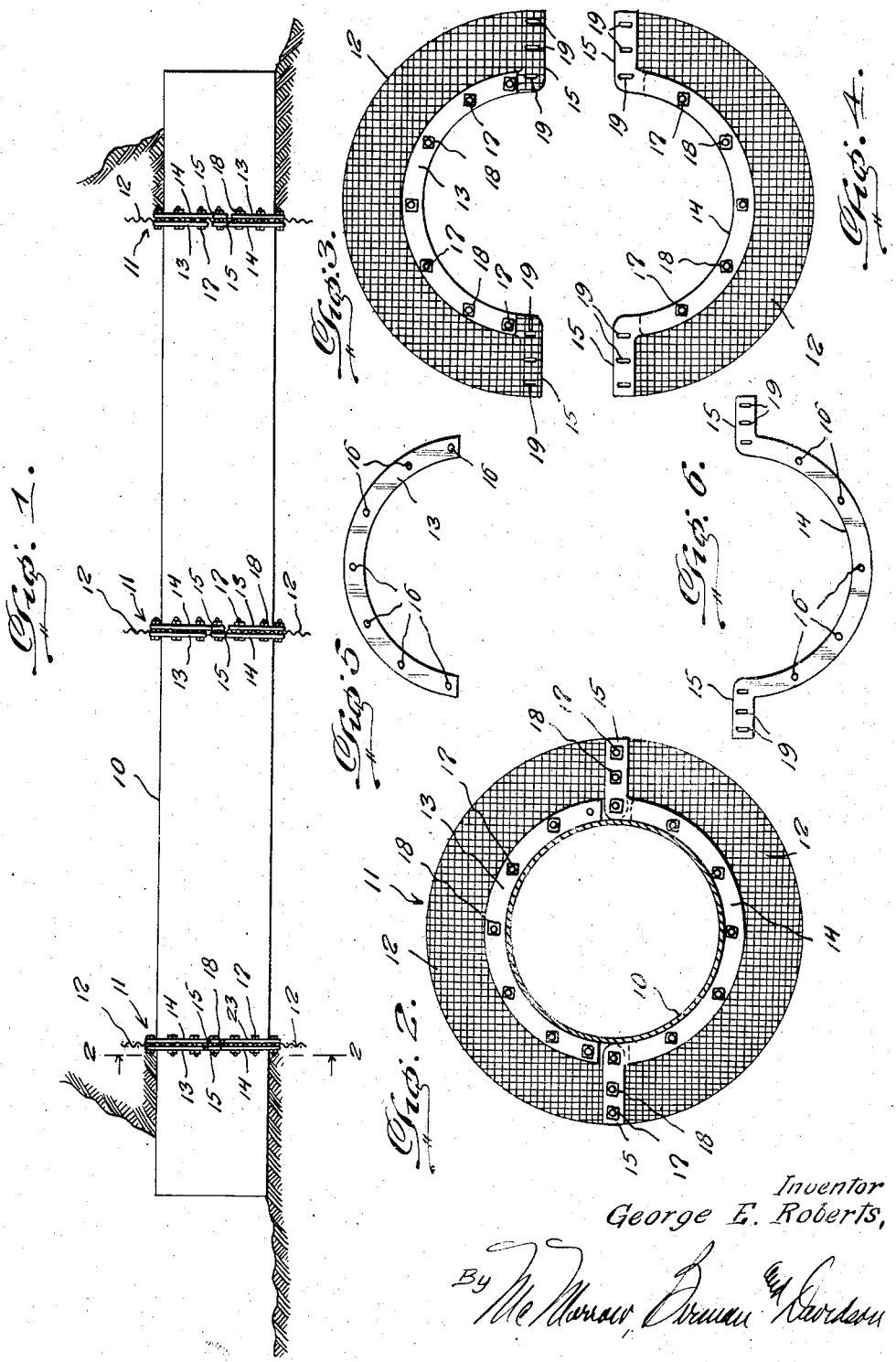
Inventor
George E. Roberts,
By
Attorneys Patented Apr. 13, 1948

2,439,488

UNITED STATES PATENT OFFICE 2,439,488

WASH CHECK COLLAR

George E. Roberts, Martinsville, Mo.

Application January 25, 1946, Serial No. 643,312

2 Claims. (Cl. 61—16)

My invention relates to tubes or culverts and more especially to a device adapted to be attached to a tube or culvert.

The object of my invention is to provide an attachment for a culvert or the like adapted to prevent the soil in which the tube or culvert is embedded from being washed out.

Another object of my invention is to provide an attachment to a culvert or the like to prevent insects or animals from burrowing under said culvert and thereby starting channels which in time would cause cave-ins or wash-outs.

A further object of my invention is to provide an attachment to a culvert or the like adapted to catch and hold any loose dirt or the like caused to break away from the soil, in which the culvert is embedded, by hot dry weather or through the effect of alternating freezing and thawing.

Other objects of my invention may appear in the following specification describing my invention with reference to the accompanying drawing illustrating a preferred embodiment of my invention. It is however to be understood that my invention is not to be limited or restricted to the exact construction and combination of parts shown in the drawing and described in the specification, but that such changes and modifications can be made which fall within the scope of the claims appended hereto.

In the drawing:

Figure 1 shows a culvert equipped with wash check collars according to my invention.

Figure 2 is a sectional view taken on line 2—2 of Figure 1.

Figure 3 is a detail view in a larger scale of one unit forming the wash check collar according to my invention.

Figure 4 is a detail view of a unit cooperating with the unit shown in Figure 3 to form the wash check collar according to my invention.

Figure 5 is a detail view of a part of the frame of the wash check collar according to my invention, and Figure 6 is a detail view of another part of the frame of the wash check collar according to my invention.

Referring now in detail to the drawing a culvert tube 10 is embedded in the soil under a roadway or the like.

Wash check collars 11 are attached to the culvert tube in desired distances from each other.

Each check collar 11 consists of two substantially semi-circular strips of metal screening 12. The inner radius of each of these strips is such that the two strips fit onto the culvert tube 10.

Each screen strip 12 projects from a semi-circular shaped frame section, said section consists of two substantially semi-circular half collars 13 and two second substantially semi-circular half collars 14. These half collars are preferably made from flat bar iron and the secondly named half collars 14 have on their two ends diametrically and outwardly extending arms 15. The inside radii of these half-collars 13 and 14 are the same as the inside radii of the screen strips 12. The half collars are arranged on the screen strips so that one half collar 13 is located on one side of a strip 12 and one half collar 14 on the other side. The half collars 13 do not extend all the way over the strips 12 but stop approximately even with the outer edges of the arms 15. In the half collars and the strips holes 16 are provided at regular intervals from each other and bolts 17 having nuts 18 thereon extend through said holes and clamp the three elements together.

While nuts and bolts are being used in the present embodiment of my invention, it is to be understood that the three elements may be connected in any other desired conventional way, for instance, by welding, soldering, etc.

In the arms 15 and the wire screening adjacent thereto a plurality of rectangular or oblong holes 19 are provided, adapted to receive bolts 17 therein.

When the semi-circular shaped frame sections are to be attached to a culvert tube 10 they are arranged so that one half collar 13 and one half collar 14 will be located at the same side. In this manner the arms 15 on the half collar 14 on one side will cover the arms 15 of the half collar 14 on the other side to thereby provide a co-acting means adjacent the edge faces of the thus-arranged sections for securing the latter together, bolts 17 extended through the corresponding holes 19 in the two corresponding arms, so that the two half check collars are firmly held together and form a wash check collar 11 which is clamped onto the culvert tube 10.

The holes 19 of two cooperating half collars 14 may be so arranged that they extend at right angles to each other. This affords a greater measure of adjustability to the parts to be assembled.

While the present embodiment of my invention describes and shows check collars consisting of two substantially similar half check collars, it is to be understood that any desired number of smaller portions may be utilized to form a whole wash check collar.

When a culvert tube is provided with one or more wash check collars as described above the screen elements of said collars will prevent the ground supporting and surrounding said culvert tube from being washed away by catching and holding ground particles, silt and the like, thereby preventing sagging down of the tube and any damage caused thereby.

Having described my invention, what I claim and desire to secure by Letters Patent is:

1. The combination with a culvert, of a wash check collar surrounding said culvert and attached thereto, said collar comprising a pair of semi-circular shaped frame sections arranged so that the edge face of one of said sections is in confronting meeting relation with the edge face of the other of said sections, a semi-circular shaped strip of metal screening projecting from each of said sections and carried thereby, and means for securing the thus assembled sections together.

2. The combination with a culvert, of a wash check collar surrounding said culvert and attached thereto, said collar comprising a pair of semi-circular shaped frame sections arranged so that the edge face of one of said sections is in confronting meeting relation with the edge face of the other of said sections, a semi-circular shaped strip of metal screening projecting from each of said sections and carried thereby, and co-acting means adjacent the edge faces of the thus arranged sections for securing the latter together.

GEORGE E. ROBERTS.

REFERENCES CITED

The following references are of record in the file of this patent:

FOREIGN PATENTS

| Number | Country | Date |
|--------|---------|------|
| 85,180 | Switzerland | 1920 |